United States Patent
Hilberer et al.

(10) Patent No.: US 9,573,577 B2
(45) Date of Patent: Feb. 21, 2017

(54) PARKING BRAKE SYSTEM

(75) Inventors: Eduard Hilberer, Hockenheim (DE); Michael Herges, Munich (DE); Peter Szell, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/049,406

(22) Filed: Mar. 16, 2011
(Under 37 CFR 1.47)

(65) Prior Publication Data
US 2011/0303501 A1 Dec. 15, 2011

Related U.S. Application Data

(63) Continuation of application No. PCT/EP2009/006732, filed on Sep. 17, 2009.

(30) Foreign Application Priority Data

Sep. 17, 2008 (DE) .................. 10 2008 047 632

(51) Int. Cl.
*B60T 8/36* (2006.01)
*B60T 13/68* (2006.01)
(Continued)

(52) U.S. Cl.
CPC .............. *B60T 13/683* (2013.01); *B60T 13/38* (2013.01); *B60T 15/18* (2013.01); *B60T 17/02* (2013.01); *B60T 17/04* (2013.01)

(58) Field of Classification Search
CPC ......... B60T 11/108; B60T 11/28; B60T 11/34; B60T 13/26; B60T 13/36; B60T 13/66; B60T 13/662; B60T 13/68; B60T 13/683; B60T 15/02; B60T 12/025; B60T 15/027; B60T 15/181; B60T 15/182; B60T 17/18; B60T 17/22; B60T 17/221; B60T 2230/06; B60T 13/38; B60T 15/025; B60T 17/02; B60T 17/04; B60T 15/18
(Continued)

(56) References Cited

U.S. PATENT DOCUMENTS 4,223,767 A * 9/1980 Powell ........................ 188/112 A
5,046,786 A * 9/1991 Johnston et al. ................. 303/7
(Continued)

FOREIGN PATENT DOCUMENTS

CN 1826225 A 8/2006
CN 1989033 A 6/2007
(Continued)

OTHER PUBLICATIONS

Machine Translation of DE-102006055570.*
(Continued)

*Primary Examiner* — Melody Burch
(74) *Attorney, Agent, or Firm* — Crowell & Moring LLP

(57) ABSTRACT

A parking brake system for a vehicle includes an at least partially bistable valve unit to generate a control pressure for controlling at least one function of the parking brake system, and a relay valve which receives the control pressure from the valve unit and either pressurizes or bleeds at least one spring-loaded cylinder according to the control pressure. The valve unit is integrated into a first module integrated into a compressed air supply unit, and the relay valve is arranged in a second module which is arranged at a distance from the first module and the compressed air production system.

5 Claims, 3 Drawing Sheets

(51) Int. Cl.
  *B60T 13/38* (2006.01)
  *B60T 15/18* (2006.01)
  *B60T 17/02* (2006.01)
  *B60T 17/04* (2006.01)
  *B60T 13/74* (2006.01)

(58) Field of Classification Search
  USPC .. 303/3, 7, 9.66, 9.76, 15, 123, 124, DIG. 1, 303/DIG. 2
  See application file for complete search history.

(56) References Cited

U.S. PATENT DOCUMENTS

| | | | |
|---|---|---|---|
| 5,061,015 A | | 10/1991 | Cramer et al. |
| 5,332,297 A | * | 7/1994 | Cunkelman et al. ............ 303/15 |
| 5,848,826 A | * | 12/1998 | Muller .......................... 303/22.4 |
| 6,056,000 A | * | 5/2000 | Santacatterina et al. ......... 137/1 |
| 6,508,522 B1 | * | 1/2003 | Li et al. ........................ 303/139 |
| 7,431,406 B2 | | 10/2008 | Aumueller et al. |
| 7,784,879 B2 | * | 8/2010 | Koelzer ............................ 303/3 |
| 7,832,813 B2 | | 11/2010 | Bensch et al. |
| 2004/0195910 A1 | | 10/2004 | Aumuller et al. |
| 2009/0256416 A1 | | 10/2009 | Bensch et al. |
| 2010/0078988 A1 | | 4/2010 | Bensch et al. |

FOREIGN PATENT DOCUMENTS

| | | |
|---|---|---|
| DE | 103 14 642 B3 | 11/2004 |
| DE | 10 2006 041 009 A1 | 3/2008 |
| DE | 10 2006 041 011 A1 | 3/2008 |
| DE | 10 2006 054 433 A1 | 5/2008 |
| DE | 10 2006 055 570 A1 | 5/2008 |
| DE | 10 2007 042 316 A1 | 5/2008 |
| EP | 1923286 | 5/2008 |
| EP | 2 099 666 B1 | 6/2010 |
| JP | 05/503904 | 6/1993 |
| JP | 09/506314 | 6/1997 |
| WO | WO 2008/025401 | 3/2008 |
| WO | WO 2008/101592 A2 | 8/2008 |

OTHER PUBLICATIONS

English Machine translation of DE-102006055570.*
English translation of DE-102006054433 also published as EP-1923284.*
German Office Action dated May 20, 2009 including English-language translation (Six (6) pages).
International Search Report dated Feb. 26, 2010 including English-language translation (Four (4) pages).
Chinese Office Action mailed Jan. 11, 2013.
Chinese Office Action dated Aug. 8, 2013 (8 pages), with English translation of German translation of the Chinese Office Action.

* cited by examiner

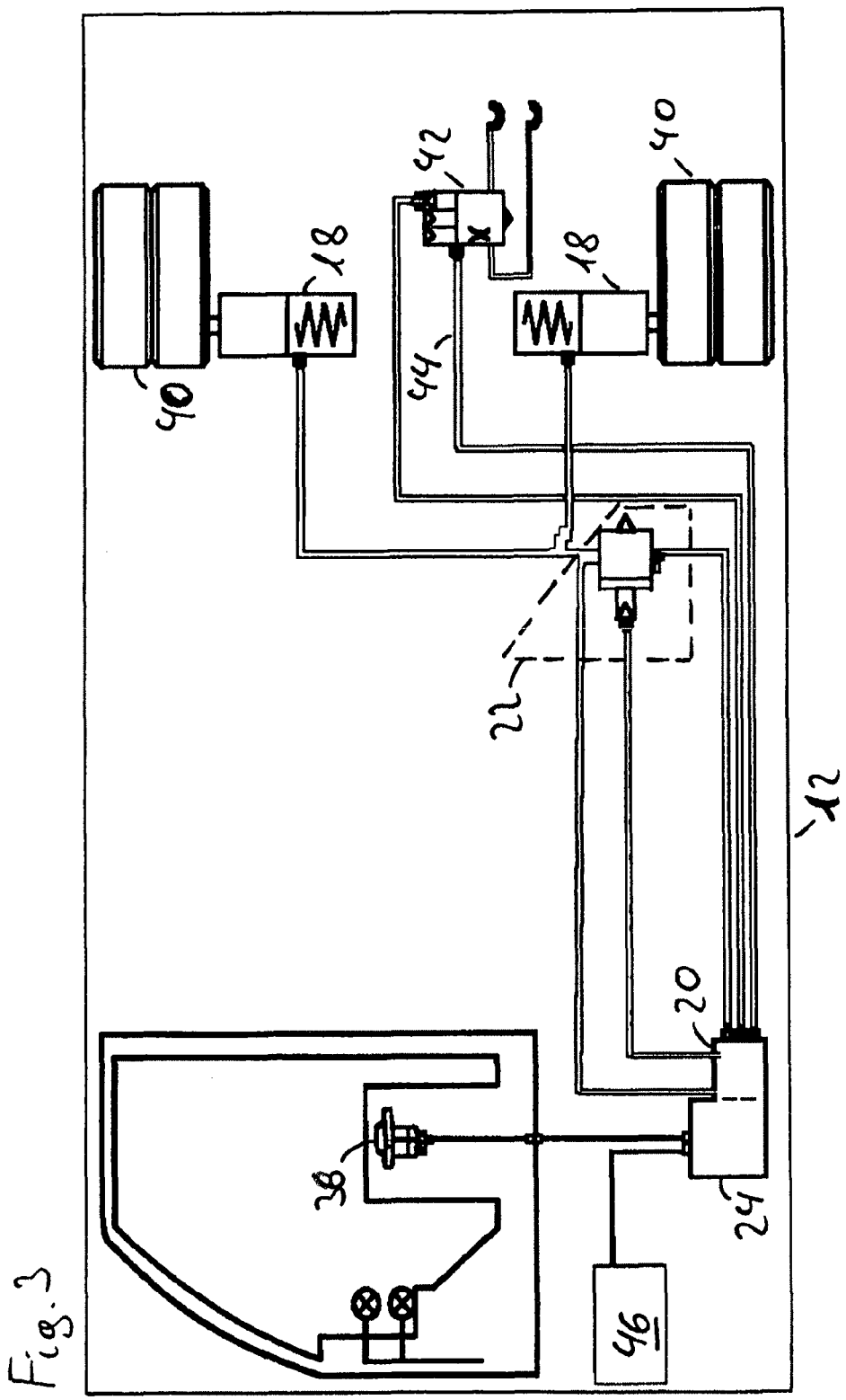

PARKING BRAKE SYSTEM

CROSS-REFERENCE TO RELATED APPLICATIONS

This application is a continuation of PCT International Application No. PCT/EP2009/006732, filed Sep. 17, 2009, which claims priority under 35 U.S.C. §119 from German Patent Application No. DE 10 2008 047 632.3, filed Sep. 17, 2008, the entire disclosures of which are herein expressly incorporated by reference.

BACKGROUND AND SUMMARY OF THE INVENTION

The invention relates to a parking brake system for a vehicle, including an at least partially bistable valve unit for generating a control pressure for the pilot control of at least one function of the parking brake system, and a relay valve which receives the control pressure from the valve unit and pressurizes or vents at least one spring brake cylinder as a function of the control pressure.

Parking brake systems of the above-described type are very common, particularly in commercial vehicles, where a compressed air-operated parking brake system is often provided to supplement a compressed air-operated service brake. Such parking brake systems usually include a valve unit (potentially having a plurality of individual valves), which may be electrically activated, for example, and generate different control pressures, and a relay valve, which pressurizes or bleeds (vents) the spring brake cylinders as a function of one of the control pressures. In order to facilitate the assembly of all components, all integral parts of the parking brake system are combined in a single sub-assembly, a so-called parking brake module, it being not altogether unusual for reasons of space and efficiency to integrate the parking brake module into the compressed air supply unit.

One disadvantage to such a high degree of integration of the compressed air generation system and the parking brake module is the amount of labor that needs to be expended for repairs in the event of a defect.

The object of the invention, therefore, is to at least partially solve this problem.

This, and other, objects are achieved according to the invention by a parking brake system for a vehicle, including an at least partially bistable valve unit for generating a control pressure for the pilot control of at least one function of the parking brake system, and a relay valve, which receives the control pressure from the valve unit and pressurizes or vents at least one spring brake cylinder as a function of the control pressure. The valve unit is integrated into a first module, which is integrated into a compressed air supply unit, and that the relay valve is arranged in a second module, which is arranged at an interval from the first module and the compressed air supply unit. Separating the parking brake system or, more particularly, the parking brake module into two separate modules, a first module being integrated into the compressed air supply unit and a second module being arranged at an interval from the first module and the compressed air supply unit, ensures easy replacement at least of the second module, which is not integrated into the compressed air supply unit. In this way it is possible, in particular, to replace the relay valve, which is exposed to great stresses, without additional assembly effort.

The first module advantageously includes a trailer control connection, which can be activated by a solenoid valve for performing a test function of a trailer parking brake. To generate a control pressure on the control connection, only a small volume of air is generally needed, for which reason the load acting on the valve generating it is low. An integration into the compressed air supply unit by arranging the relevant solenoid valve in the first module is therefore advantageous.

It is especially preferred if the solenoid valve can be activated with pulse width modulation, in order to provide an anti-jackknife braking function on the trailer control connection. The facility for pulse width-modulated activation allows a continuous pressure modulation on the trailer control connection, affording a graduated braking action of the trailer parking brake. This in turn allows a braking of the vehicle with connected trailer independently of the service brake.

It is also feasible to provide a pressure sensor integrated into the first module for regulating the pressure of a trailer control. The closing of the pressure regulating circuit by a pressure sensor integrated into the first module allows monitoring of the control pressure present on the trailer control connection for little outlay.

In particular, the at least partially bistable valve unit may include a bistable solenoid valve, in order to avoid unwanted closing or opening of the parking brake in the event of a defect. This increases the vehicle safety in general, since a sudden opening of the parking brake system while a vehicle is stationary is excluded in exactly the same way as a sudden closing of the parking brake system while a vehicle is in motion.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a vehicle comprising an exemplary parking brake system according to the invention.

DETAILED DESCRIPTION OF THE DRAWINGS

Figure 1:
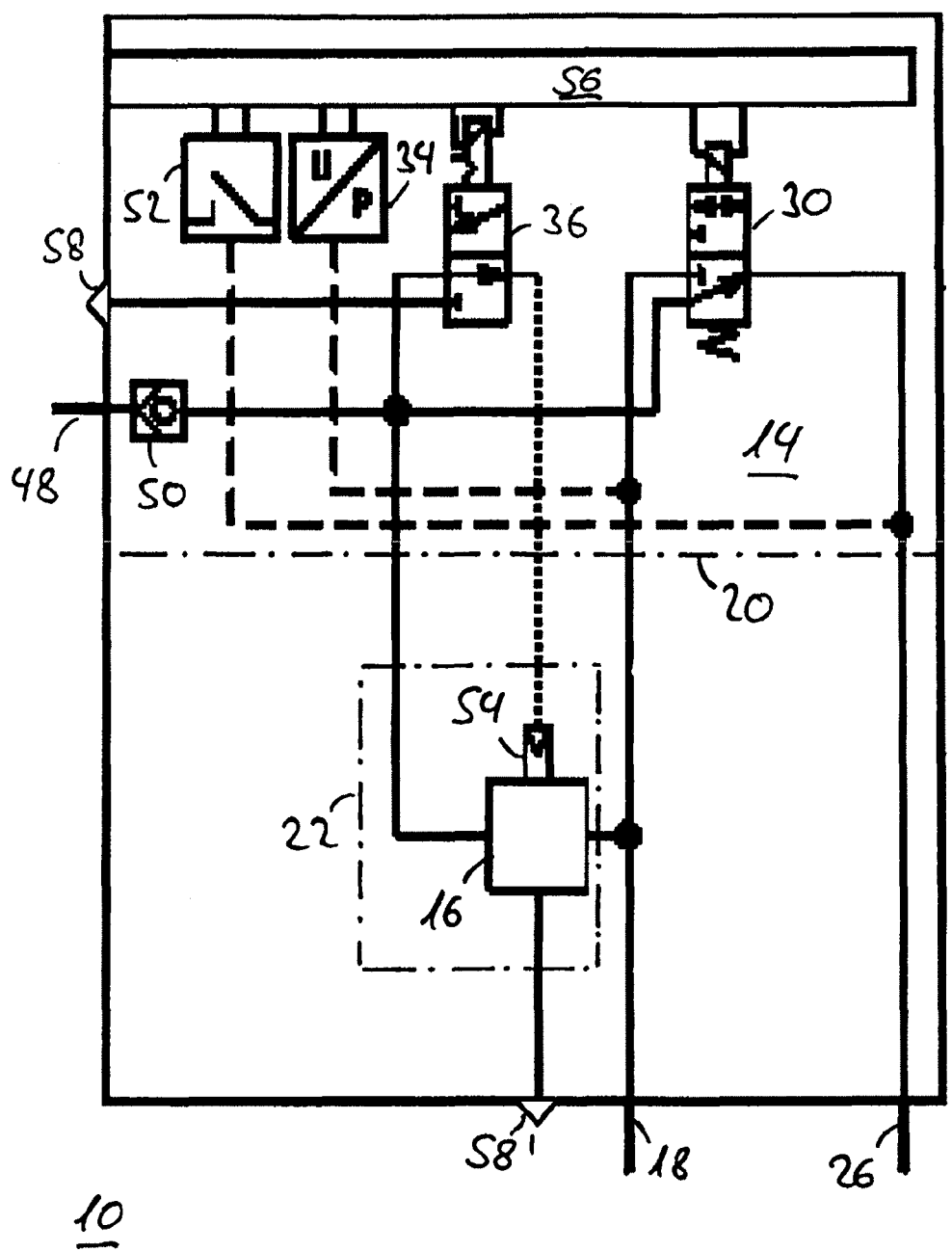
FIG. 1 shows a first embodiment of a parking brake system.

In the following drawings the same reference numerals denote identical or equivalent parts.

FIG. 1 shows a first embodiment of a parking brake system. The parking brake system 10 is divided into a first module 20 and a second module 22 arranged apart at a distance from the first module 20. The first module 20 includes a valve unit 14 and a control unit 56, while a relay valve 16 is arranged in the second module 22. The relay valve 16 arranged in the second module 22 is coupled by pressure lines to the valve unit 14 arranged in the first module 20. Supply pressure is deliverable via a line.

Downstream of a non-return valve 50, a bistable solenoid valve 36, which is part of the valve unit 14, is subjected to a supply pressure via a pressure supply 48. The bistable solenoid valve 36 can be activated by the control unit 56 and, in the switching position as shown, admits the supply pressure to a control inlet 54 of the relay valve 16. A spring brake cylinder 18 connected downstream of the relay valve 16 is therefore pressurized when the bistable solenoid valve 36 is in the switching position shown, for which reason the parking brake system 10 is opened (inactive).

The pressure prevailing in the spring brake cylinder 18 can be detected via a pressure sensor 34. A solenoid valve 30 is coupled to the pressure supply 48 independently of the bistable solenoid valve 36, and in the switching position as shown, generates a persistent trailer control pressure on a trailer control connection 26.

The solenoid valve 30 may be designed in various ways and can also be activated with pulse width modulation. The control pressure present on the trailer control connection 26 can be detected via a pressure switch 52. If the bistable solenoid valve 36 is brought into its switched state (not shown), the control inlet 54 is bled via a vent 58, whereupon the spring brake cylinder 18 is also bled via a vent 58'. In this switching state the parking brake of the vehicle is closed (active), while independently of this yet another trailer control pressure is generated on the trailer control connection 26. If the solenoid valve 30 is also brought into its switched state (not shown), the trailer control connection 26 is likewise bled via the vent 58'. A 2/2-way directional control valve (not shown), which as a holding valve maintains the pressure at the control inlet 54 of the relay valve 16 irrespective of the switching state of the bistable solenoid valve 36, may be arranged in the control line between the bistable solenoid valve 36 and the relay valve 16. A test function, that is to say the independent actuation of the parking brake of the tractor vehicle and a coupled trailer, is possible, since the control pressures on the outlets 18 and 26 do not have to be generated together.

Figure 2:
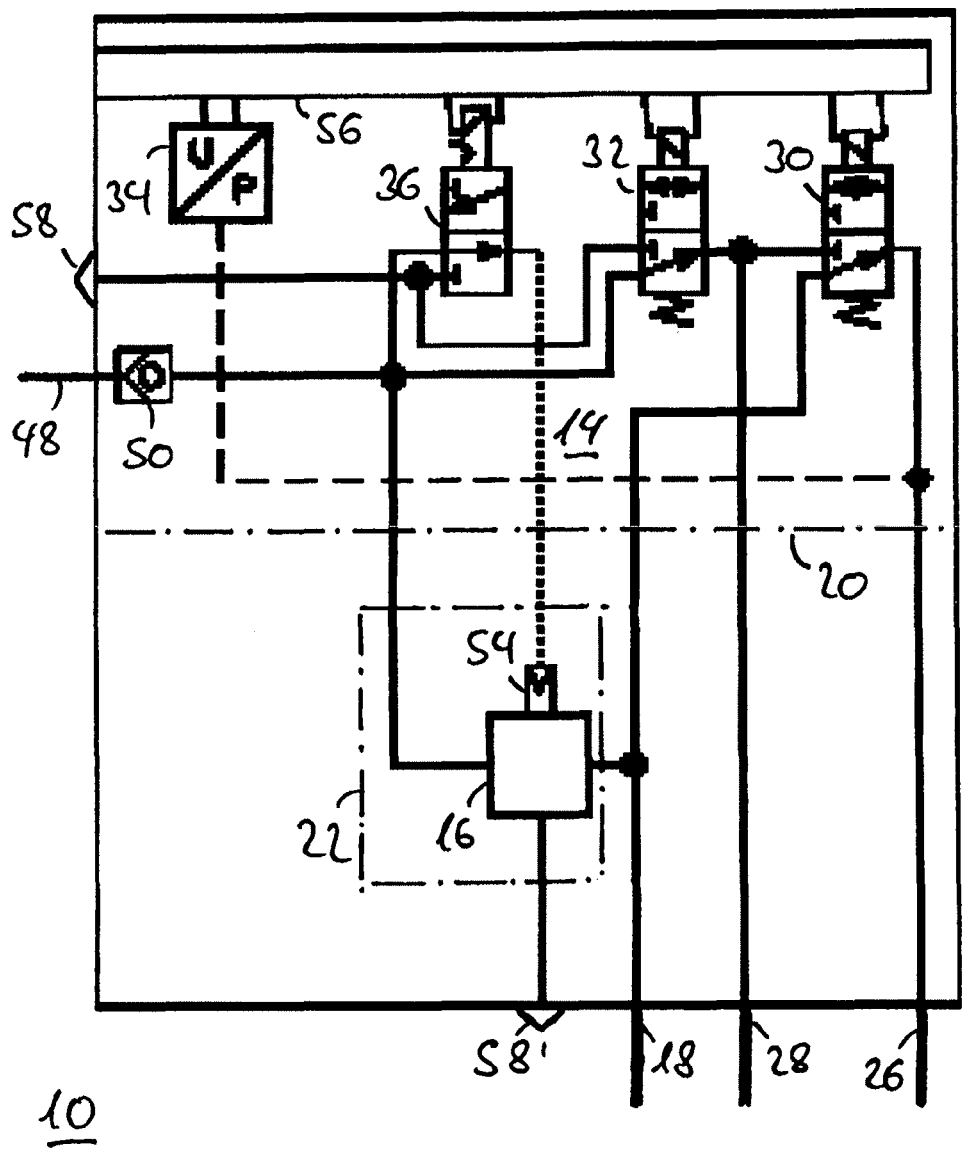
FIG. 2 shows a second embodiment of a parking brake system.

FIG. 2 shows a second embodiment of a parking brake system. The parking brake system 10 in FIG. 2 is modified in relation to the parking brake system disclosed by FIG. 1 through the addition of a further solenoid valve 32 to the valve unit 14. The further solenoid valve 32 is arranged between the solenoid valve 30 and the pressure supply 48 and supplies a further trailer control connection 28 with a trailer control pressure. In the parking brake system 10 according to FIG. 2, selective use is made of either the trailer control connection 26 or the further trailer control connection 28. If the trailer control connection 26 is used, the parking brake system 10 functions in a manner comparable to that according to FIG. 1.

In the switching state of the valve unit 30 as shown, the trailer control module, not shown here, is activated by way of the trailer control connection 26 as a function of the activation of the relay valve 16 by the bistable solenoid valve 36. Here too, a test function by the solenoid valve 30 is feasible, since the solenoid valve 30 can be coupled directly to the pressure supply 48 via the further solenoid valve 32 when it is in the switching state shown. A test function is also possible on the further trailer control connection 28, since the control pressure provided can be isolated from the pressurizing and venting of the spring brake cylinder 18.

The parking brake system 10 according to FIG. 2 is therefore particularly flexible in its scope for adaptation to customer requirements. Should a vehicle manufacturer require an activation of the trailer control module coupled to the activation of the relay valve 16, the trailer control connection 26 is provided, while the further trailer control connection 28 is closed, either by an end plug or by not introducing the corresponding air port into the first module 20 during production. Conversely, if provision is required for bleeding of the trailer control module 10 irrespective of the bleed position of the relay valve 16, the further trailer control connection 28 is provided, while the trailer control connection 26 is then not needed. In particular, this also allows account to be taken of customer requirements for a braked trailer in the parked state or an unbraked trailer in the parked state, that is according to which trailer control connection 26, 28 is used.

FIG. 3 is a schematic diagram showing a vehicle having an exemplary parking brake system according to the invention. The vehicle 12 represented in FIG. 3 is only indicated schematically in order to illustrate the position of important components of the parking brake system inside the vehicle 12. A first module 20 is integrated into a compressed air supply unit 24, which in order to increase the availability has a redundant coupling to a power supply 46. The compressed air supply unit 24 is furthermore coupled to a manual control unit 38 for the detection of the driver's intentions. The compressed air supply unit 24 or the first module 20 has a trailer control connection 26, 28 and a pressure supply 44 for a trailer control module 42, to which it is coupled via pressure lines. The compressed air supply unit 24 or the first module 20 furthermore has connections for a second module 22, which is arranged apart and at a distance from the first module 20 and the compressed air supply unit 24, and which, in particular, includes the relay valve 16 disclosed, for example, in FIGS. 1 and 2. Spring brake cylinders 18 arranged on wheels 40 for opening and closing the parking brake system are pressurized and bled via the second module 22.

| Table of Reference Numerals | |
|---|---|
| 10 | parking brake system |
| 12 | vehicle |
| 14 | valve unit |
| 16 | relay valve |
| 18 | spring brake cylinder |
| 20 | first module |
| 22 | second module |
| 24 | compressed air supply unit |
| 26 | trailer control connection |
| 28 | further trailer control connection |
| 30 | solenoid valve |
| 32 | further solenoid valve |
| 34 | pressure sensor |
| 36 | bistable solenoid valve |
| 38 | manual control unit |
| 40 | wheel |
| 42 | trailer control module |
| 44 | pressure supply |
| 46 | power supply |
| 48 | pressure supply |
| 50 | non-return valve |
| 52 | pressure switch |
| 54 | control inlet |
| 56 | control unit |
| 58 | vent |
| 58' | vent |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A parking brake system for a vehicle, comprising:
   an at least partially bistable valve unit for generating a control pressure for pilot control of at least one function of the parking brake system;
   a relay valve operatively configured to receive the control pressure from the valve unit and via a relay valve outlet line pressurize or bleed at least one spring brake cylinder as a function of the control pressure;

a compressed air supply unit for generating compressed air;

a first module in which is integrated the at least partially bistable valve unit, the first module being integrated into the compressed air supply unit; and a second module in which is arranged the relay valve, the second module being located apart and at a distance from the first module and the compressed air supply unit;

wherein the first module further comprises:

- a first solenoid valve of the at least partially bistable valve unit arranged downstream of a pressure supply, the first solenoid valve having a first port arranged to receive from the relay valve outlet line the compressed air generated by the compressed air supply unit;
- a second solenoid valve of the at least partially bistable valve unit arranged between the pressure supply and the first solenoid valve in a compressed air supply line separate from the relay valve outlet line, the compressed air supply line communicating with a second port of the first solenoid valve, and
- a first trailer control connection that is activatable by the first solenoid valve for performing a test function of a trailer parking brake and a second trailer control connection that is activatable by the second solenoid valve for performing a test function of the trailer parking brake, the second trailer control connection communicating with the compressed air supply line between the first and second solenoid valves.

2. The parking brake system according to claim 1, wherein the first module further comprises a pressure sensor integrated into the first module, the pressure sensor regulating a pressure of the first trailer control connection.

3. The parking brake system according to claim 1, wherein the at least partially bistable valve unit comprises a bistable solenoid valve, whereby unwanted closing or opening of the parking brake in an event of a defect is avoided.

4. The parking brake system according to claim 2, wherein the at least partially bistable valve unit comprises a bistable solenoid valve, whereby unwanted closing or opening of the parking brake in an event of a defect is avoided.

5. The parking brake system according to claim 1, wherein at least one of the first solenoid valve and the second solenoid valve is operated with pulse width modulation when operated to provide an anti jackknife braking function on the trailer, and switches between a closed state and an open state in response to pulse width modulation to provide continuous pressure modulation at the trailer.

* * * * *